(12) United States Patent
Axon et al.

(10) Patent No.: US 8,651,459 B2
(45) Date of Patent: Feb. 18, 2014

(54) APPARATUS AND METHOD FOR DISPENSING FISH TAPE

(75) Inventors: Ronald G. Axon, Rockton, IL (US); Douglas J. Birkholz, Madison, WI (US); Thomas Pearson, Rockford, IL (US); Jeffrey J. Plummer, Rockford, IL (US)

(73) Assignee: Textron Innovations Inc., Providence, RI (US)

( * ) Notice: Subject to any disclaimer, the term of this patent is extended or adjusted under 35 U.S.C. 154(b) by 317 days.

(21) Appl. No.: 13/028,374

(22) Filed: Feb. 16, 2011

(65) Prior Publication Data

US 2011/0133142 A1 Jun. 9, 2011

Related U.S. Application Data

(63) Continuation of application No. PCT/US2009/054777, filed on Aug. 24, 2009.

(60) Provisional application No. 61/091,132, filed on Aug. 22, 2008.

(51) Int. Cl.
*H02G 1/08* (2006.01)

(52) U.S. Cl.
USPC ......... 254/134.3 R; 254/134.3 FT; 254/134.4

(58) Field of Classification Search
USPC .................... 254/134.3 FT, 134.3 R, 134.4
See application file for complete search history.

(56) References Cited

U.S. PATENT DOCUMENTS

| | | | | |
|---|---|---|---|---|
| 1,880,705 A | * | 10/1932 | Bitner | 242/381.6 |
| 3,028,146 A | | 4/1962 | Sparks | |
| 3,067,984 A | * | 12/1962 | Linden | 254/134.3 FT |
| 5,056,731 A | * | 10/1991 | Koehn | 242/405.3 |
| 5,340,084 A | * | 8/1994 | Crates et al. | 254/134.3 FT |
| 6,361,021 B1 | * | 3/2002 | Brennan | 254/134.3 FT |
| 6,416,040 B1 | * | 7/2002 | Bergman | 254/134.3 FT |
| 6,722,603 B1 | * | 4/2004 | Atencio | 242/390.8 |
| 6,751,883 B2 | | 6/2004 | Liao | |
| 7,044,415 B2 | * | 5/2006 | Wiesemann et al. | 242/405.3 |
| 7,100,900 B2 | * | 9/2006 | Radle et al. | 254/134.3 FT |
| 7,374,150 B2 | * | 5/2008 | Wiesemann et al. | 254/134.3 FT |
| D574,277 S | | 8/2008 | Kendzierski et al. | |

FOREIGN PATENT DOCUMENTS

WO  WO2005/014451  2/2005
WO  WO2005014451 A2 * 2/2005

OTHER PUBLICATIONS

International Preliminary Report on Patentability; Eight (8) pages; Dated Feb. 22, 2011.

\* cited by examiner

*Primary Examiner* — Lee D Wilson
*Assistant Examiner* — Nirvana Deonauth
(74) *Attorney, Agent, or Firm* — Klintworth & Rozenblat IP LLC

(57) ABSTRACT

A device for dispensing fish tape includes a pair of outside walls and outer and inner annular walls depending generally perpendicularly from the edges of the outside walls. Intermediate pinch ring walls depend generally perpendicularly from the outside walls and are positioned between the inner and outer walls. A plurality of spaced apart protuberances are provided on the intermediate walls and engage undulations on a hoop of a winding belt mounted within the device. A fish tape is mounted within the device and engages with the winding hoop. Each outside wall has a flat section extending from the outer edge thereof toward the inner edge thereof, and a raised section extending from the flat section to the inner edge.

25 Claims, 5 Drawing Sheets

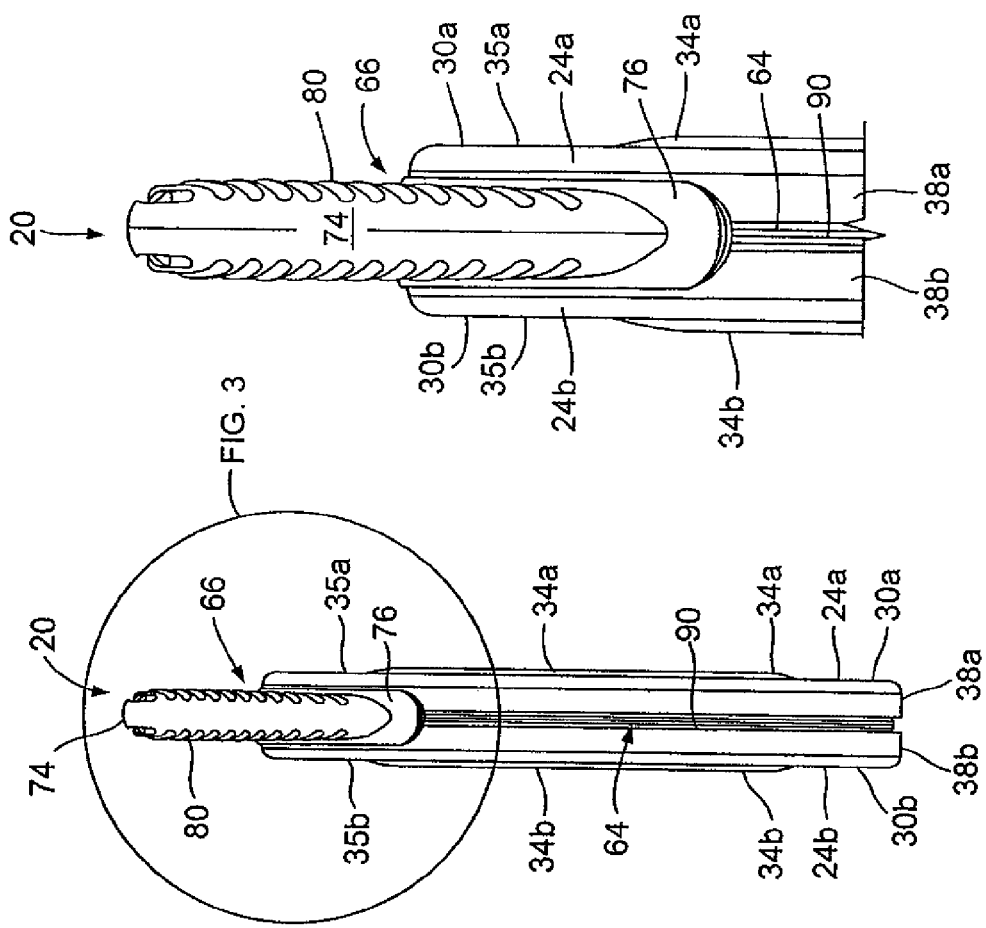
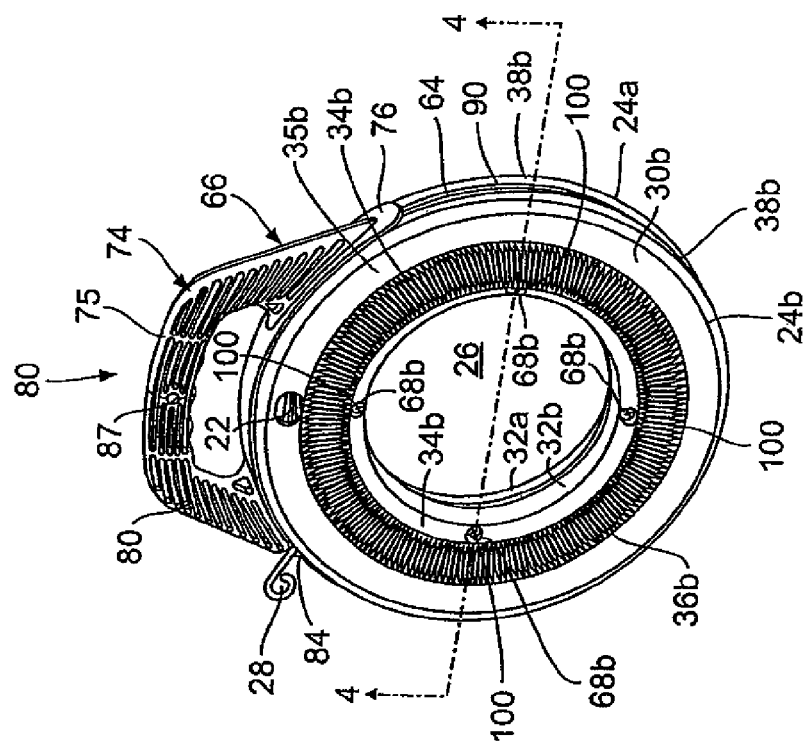

APPARATUS AND METHOD FOR DISPENSING FISH TAPE

This application is the National Phase filing of PCT/US2009/054777, filed on Aug. 24, 2009, and claims the benefit of U.S. provisional application Ser. No. 61/091,132 filed on Aug. 22, 2008, which disclosures is herein incorporated by reference in their entirety.

BACKGROUND OF THE INVENTION

Fish tape is used by electricians to pull wiring through conduit when installing wiring in new construction or when renovating or fixing the wiring in existing construction. The fish tape usually comprises a metal or plastic strip that has an eye or coupling on one of its free ends. The eye is typically inserted into an opening in a conduit and pushed through the conduit until it reaches the opening found on the other end of the conduit. If a cable puller is to be used for fishing the wire, then a pulling rope is attached to the eye of the fish tape, and the rope is then pulled through the conduit by reversing the direction of the fish tape. Finally, the pulling rope is attached to the wiring and the wiring is then pulled through the conduit via the cable puller.

On the other hand, sometimes the amount of the wiring is small enough that the forces generated by a cable puller are not necessary to pull the wiring through the conduit. In such situations, the eye of the fish tape is attached directly to the wire that is to be pulled. The fish tape is then pulled out of the conduit until the wiring has been pulled through the conduit.

Over the years, different types of devices have been employed to facilitate the dispensing and retraction of the fish tape to accomplish the tasks mentioned above. One common device comprises a generally circular case with an opening in its middle with a handle disposed outside the case that has a winding belt disposed within the case. The handle and the winding belt are integrally formed.

The case is constructed preferably by mating two identical housings that are made ABS or another suitable plastic material. Each housing includes an outside wall that is configured like a flat ring. An outer annual wall depends perpendicularly from the outside peripheral edge of the outside wall, and an inner annular wall depends perpendicularly from the inside peripheral edge of the outside wall. A pinch ring wall depends from the outside wall and is perpendicular thereto. This pinch ring wall is typically located a small distance inside the outer annular wall. When the two housings are mated with each other, the pinch ring walls and the inner annular walls abut each other, closing off the interior of the housings to the outside. A central hole is formed at the center of the device by the inner annular wall.

The height of the outer annular wall is slightly less than the height of the inner annular wall and the pinch ring wall. When the housings are mated, the device, which has a generally annular shape, has an annular chamber that is defined by the outer annular walls and the pinch ring walls. A slight gap is formed between the outer annular walls along the outer circumference of the mated housings that exposes the annular chamber to the outside. The winding belt is disposed within this annular chamber. The winding belt is made of nylon or another suitable plastic material, and can freely slide in the annular chamber when wound by a user. The handle which is attached to the winding belt, is positioned proximate to the outer surfaces of the outer annular walls.

A fish tape storage chamber in which the fish tape is stored, is defined by the outside walls, the pinch ring walls, and the inner annular walls. The majority of the pinch ring walls abut each other except for a predetermined area on each housing. In this area, the housings are slightly spread apart so the fish tape can extend from the storage chamber, in between the pinch ring walls of the housings and into the annular chamber.

The winding belt obstructs the gap between the outer annular walls such that the fish tape that is held in the storage chamber cannot fall out of the device unintentionally. It should be noted that it is preferable to have the winding belt be continuous, forming a complete circle, to make sure that the fish tape does not exit the device, should the device be dropped or impacted.

Upon assembly, the free end of the fish tape that has the eye is fed through a slot found in the handle. The other free end of the fish tape is attached to one housing so the fish tape cannot be completely pulled out of or separated from the device. The bulk of the fish tape is wound in a predetermined direction and is held within the storage chamber. Once the housings are fully assembled with the winding belt and fish tape disposed therein, the housings are fastened together using screws.

In certain prior art designs, the winding belt does not have a constant width. Instead, the side walls of the winding belt that connect the inner and outer circumferential surfaces of the winding belt are not flat, but are straight and angled so that the width of the winding belt varies. Typically, the width of the winding belt is its greatest next to the slot in the handle, which helps to ensure that the two housings remain apart, easing the dispensing and retraction of the fish tape by making sure that the pinch ring walls do not press too tightly on the fish tape. The winding belt then narrows and has its minimum width at the point that is diametrically opposite the slot of the handle, which minimizes the amount of friction that occurs between the housings and the winding belt when the winding belt slides in the annular chamber.

This device is used in the following manner. The user holds the device with one hand by placing his/her hand within the central hole of the device such that the exposed surfaces of the inner annular walls fit in the central portion of the palm of the user's hand. At the same time, the fingers of the user's hand grasps the outside wall of one housing, while the portion of the palm next to the user's wrist and thumb press onto the outside wall of the other housing. The user then uses the other hand to pull on the handle in a direction opposite of the direction that the fish tape is wound within the device while holding the device stationary with the other hand. This motion causes the winding belt to slide in a circular manner within the annular chamber and slowly forces the fish tape out of the device to dispense the fish tape. The user then pushes on the handle in the opposite direction to cause the winding belt to slide in the other direction which causes the fish tape to be retracted into the device. As the fish tape is dispensed and retracted, the slight gap between the pinch ring walls follows along the perimeter of the device next to the slot of the handle as it is moved.

Obviously, there is a fair amount of friction that the user must overcome in order to effectuate the dispensing and retracting of the fish tape. For example, the coils of fish tape are under some spring tension when they are wound into the device so that some friction is produced between the coils as they contact each other and the walls of the device. In addition, the winding belt typically has inner and outer circumferential walls that are flat and contact the outer annular walls and pinch ring walls as the winding belt slides. Also, the side walls of the winding belt that connect the inner and outer circumferential walls are also flat, or angled as previously described, and contact the outer walls of the device. Consequently, even more friction is generated as the user tries to dispense or retract the fish tape by sliding the handle and the winding belt. This can make it difficult for the user to dispense or retract the fish tape without having the hand holding onto the device slip unintentionally, leading to wasted time and user frustration.

Accordingly, there exists a need for a device that eases the dispensing and retraction of fish tape in an easier fashion by reducing the amount of friction developed within the device when dispensing or retracting the fish tape since having angled side walls on the winding belt has not been proven to be sufficient. It is also desirable to improve the ergonomics of the device of the fish tape so that the user's hand does not slip when using the fish tape device.

BRIEF SUMMARY OF THE INVENTION

A device for dispensing fish tape includes a pair of outside walls and outer and inner annular walls depending generally perpendicularly from the edges of the outside walls. Intermediate pinch ring walls depend generally perpendicularly from the outside walls and are positioned between the inner and outer walls. A plurality of spaced apart protuberances are provided on the intermediate walls and engage a hoop of a winding belt mounted within the device. The winding belt has a plurality of undulations provided thereon which are capable of engaging the protuberances. A fish tape is mounted within the device and engages with the winding hoop. Each outside wall has a flat section extending from the outer edge thereof toward the inner edge thereof, and a raised section extending from the flat section to the inner edge. The raised sections provide for an ergonomic grip by a user.

BRIEF DESCRIPTION OF THE DRAWINGS

The organization and manner of the structure and operation of the invention, together with further objects and advantages thereof, may best be understood by reference to the following description, taken in connection with the accompanying drawings, in which:

FIG. 1 is perspective view of a device that dispenses fish tape that incorporates the features of the present invention;

FIG. 2 is a side view of the device with the gripping ribs removed for clarity;

FIG. 3 is an enlarged view of the top portion of the device shown in FIG. 2;

DETAILED DESCRIPTION OF THE ILLUSTRATED EMBODIMENTS

Figure 4:
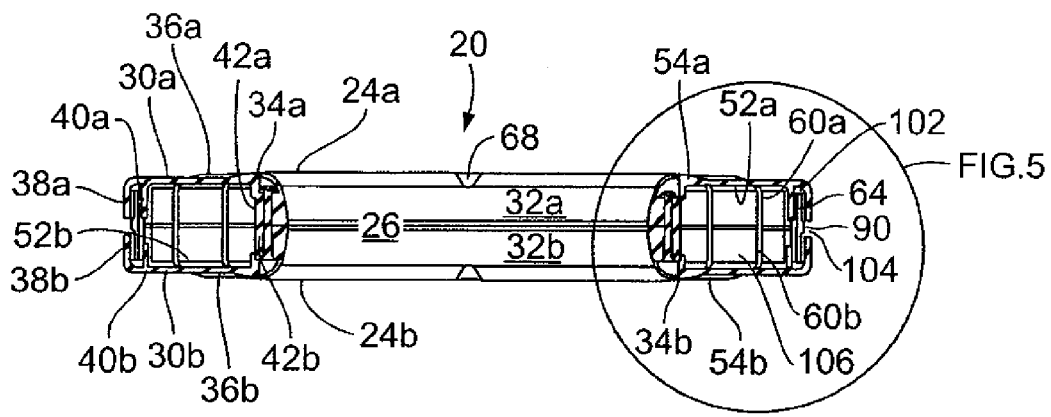
FIG. 4 is a cross-sectional view of the device taken along line 4-4 of FIG. 1.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

FIG. 1 shows a device 20 for dispensing and retracting a fish tape 22. The fish tape 22 is conventionally formed and includes a long strip of flexible metal or plastic that has an eye or coupling 28 on one of its free ends. The fish tape 22 is flat.

The device 20 includes two mated together housings 24a, 24b in which the fish tape 22 and the winding belt 66 are mounted. The housings 24a, 24b are annularly-shaped and have a central hole 26 in the middle. For the preferred embodiment, both the housings 24a, 24b and the winding belt 66 are made from polypropylene to reduce cost. Alternatively, the housing 24a, 24b and the winding belt 66 may be made of ABS or another suitable plastic material. In addition, the winding belt 66 can be made of nylon.

Figure 7:
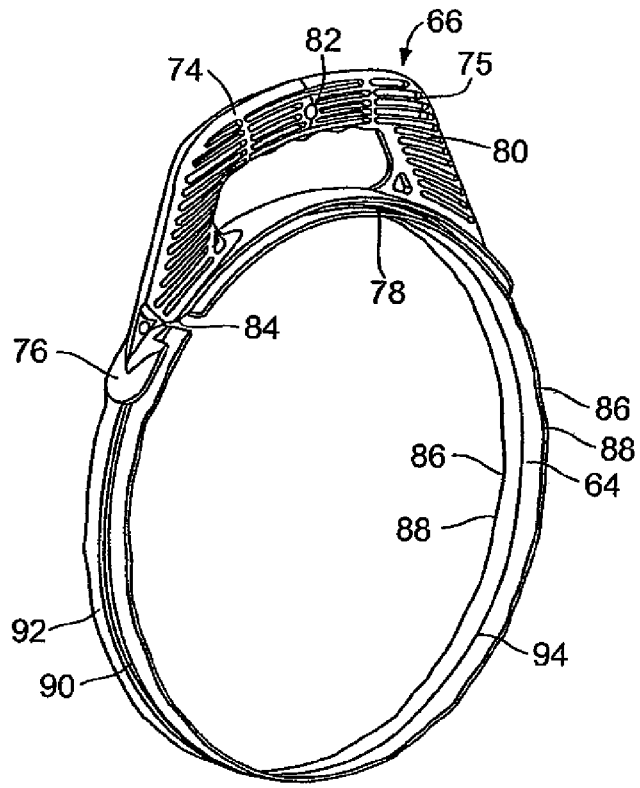
FIG. 7 is a perspective view of the winding belt that incorporates the features of the present invention.

As shown in FIG. 7, a first embodiment of the winding belt 66 includes a continuous circular hoop 64 with a handle 74 attached thereto by web 78. The hoop 64 has an outer circumferential surface 92 and a smooth inner circumferential surface 94. The web 78 extends radially outwardly from the hoop 64 from a midline of the hoop 64. The handle 74 has a hand grip portion 75 attached to an arcuate shoe portion 76. The web 78 connects an underside of the shoe portion 76 to the hoop 64 such that the shoe portion 76 is radially spaced from the hoop 64 a predetermined constant distance by the web 78.

The hand grip portion 75 of the handle 74 is configured to be grasped by the hand of the user and has a plurality of cored out sections 80 that reduce the amount of material needed to make the handle 74 and also maintains nominal wall thickness to prevent sinks or voids from forming within the handle 74 during the injection molding process. A hanging hole 82 is also disposed near the top of the handle 74 for use with display racks or for attaching other sales and marketing items to the device 20 after it has been assembled. A slot 84 is provided at one end of the hand grip portion 75 and extends through the handle grip portion 75, the shoe portion 76, the web 78 and the hoop 64.

The part of the hoop 64 that is adjacent to the shoe portion 76 has a constant width and this width is the greatest width of the hoop 64. The remainder of the hoop 64 has alternating straight sections 86 and undulating or scallop sections 88. When the device 20 is made from polypropylene, the device 20 is more flexible than prior art devices made from ABS. Therefore, some experimentation has been necessary to determine the optimum configuration of the hoop 64 made from polypropylene. As a result, the straight sections 86 are angled so that the width of the hoop 64 decreases as the hoop 64 progresses away from the slot 84 in the handle 74 until a ninety degree arc has been swept from the slot 84 of the handle 74 in the clockwise and counterclockwise directions, creating a one hundred and eighty degree arc where the width of the hoop 64 decreases. The remaining one hundred eighty degrees of the hoop 64 has straight sections 86 that are constant so that the width of the hoop 64 does not decrease.

A thickened bead 90 is provided on the midline of the hoop 64 along the outer circumferential surface 92 thereof. This bead 90 enhances the filling of the hoop 64 during the injection molding process. Likewise, the cessation of the narrowing of the hoop 64 also prevents the hoop 64 from becoming too narrow, which could lead to the inability to fill the hoop 64. Finally, the thickness of the hoop 64, as defined by the distance between the inner and outer circumferential surfaces 92, 94 of the hoop 64, is constant which also promotes the ability to fill the hoop 64 during the injection molding process.

Figure 8:
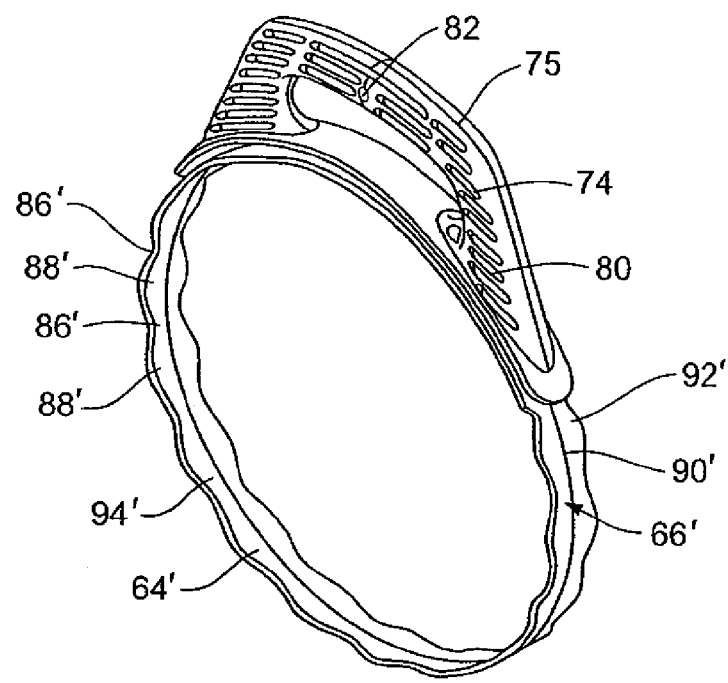
FIG. 8 is a perspective view of an alternate winding belt that incorporates the features of the present invention.

FIG. 8 shows a second embodiment of the winding belt 66' in which the shape of the undulations 88' on the hoop 64' have been modified. The part of the hoop 64' that is adjacent to the shoe portion 76 has a constant width and this width is the greatest width of the hoop 64'. The remainder of the hoop 64' has alternating grooves 86' and undulating or scallop sections 88'. As shown, the grooves 86' are curved. The scallop sections 88' may have a constant maximum width and the grooves 86' may have a constant minimum width. Alternatively, like that of the first embodiment, the grooves 86' may be angled so that the width of the hoop 64' decreases as the hoop 64' progresses away from the slot 84 in the handle 74 until a ninety degree arc has been swept from the slot 84 of the handle 74 in the clockwise and counterclockwise directions, creating a one hundred and eighty degree arc where the width of the hoop 64' decreases. The remaining one hundred eighty degrees of the hoop 64' has grooves that do not further decrease or increase the width of the hoop 64'. A thickened bead 90' is provided on the midline of the hoop 64' along the outer circumferential surface 92' thereof. This bead 90' enhances the filling of the hoop 64' during the injection molding process. Likewise, the cessation of the narrowing of the hoop 64' also prevents the hoop 64' from becoming too narrow, which could lead to the inability to fill the hoop 64'. Finally, the thickness of the hoop 64', as defined by the distance between the inner and outer circumferential surfaces 92', 94' of the hoop 64', is constant which also promotes the ability to fill the hoop 64' during the injection molding process.

Different configurations of the hoop 64, 64' can be developed for different applications. For example, a hoop 64, 64' with a completely undulating profile that has no straight sections could be used. It has been found, however, that such a profile does not work effectively with housings 24a, 24b made from polypropylene as these housings 24a, 24b tend to distort more easily when dropped or impacted, resulting in situations where the device 20 opens and the hoop 64, 64' pops slightly out and one of the low crests of the undulating profile of the hoop 64, 64' hangs up on one of the housings 24a, 24b. Instead, separating the undulating sections 88, 88' with straight or grooved sections 86, 86' achieves the desired reduction in friction but also limits the possibility of either housing 24a, 24b catching on a low point of the hoop 64, 64'. It was also found that fabricating a mold for a hoop 64, 64' that had a completely undulating profile was difficult and that filling such a mold during the injection molding process was also difficult.

Similarly, the hoop 64, 64' of the preferred embodiment is symmetrical about is midplane such that the undulating and straight or grooved sections 86, 86', 88, 88' are mirrored from one side of the hoop 64, 64' to the other. Of course, it is contemplated that other configurations that are not symmetrical could be used.

The housing 24a includes a circular outside wall 30a having an inside peripheral edge 27a and an outside peripheral edge 29a, an inner wall portion 32a which depends generally perpendicular from the outside wall 30a along the inside peripheral edge 27a thereof, an outer wall portion 38a which depends generally perpendicular from the outside wall 30a along the outside peripheral edge 29a thereof, a pinch ring wall portion 40a which depends generally perpendicular from the outside wall 30a and is spaced a small distance inwardly from the outside wall 30a, and a locking wall portion 42a which depends generally perpendicular from the outside wall 30a and is spaced a small distance outwardly from the inner wall portion 32a.

Figure 5:
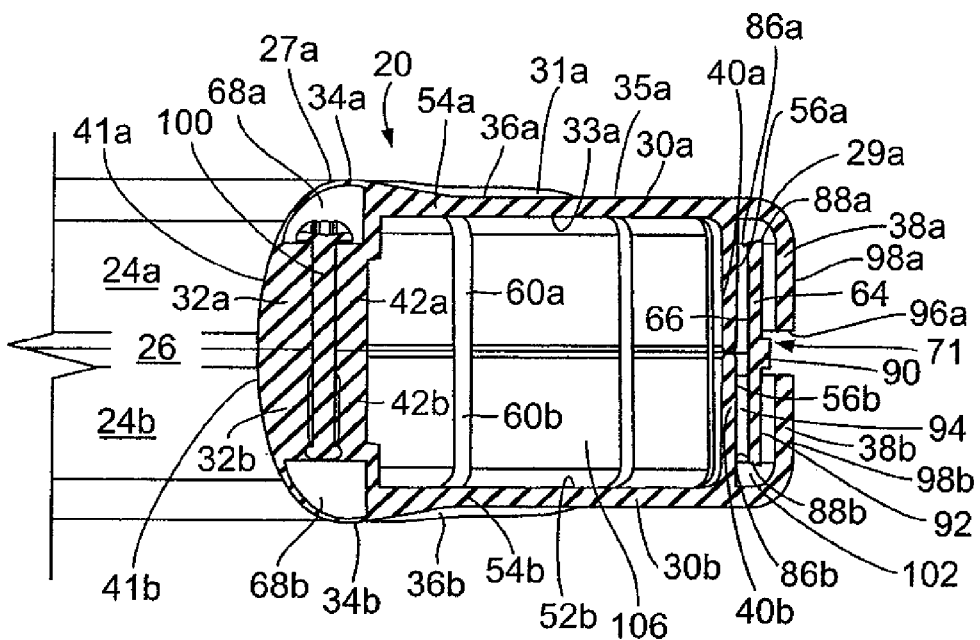
FIG. 5 is an enlarged view of the of the right portion of the device shown in FIG. 4.

The circular outside wall 30a has an outer surface 31a and an inner surface 33a. The wall portions 32a, 38a, 40a, 42a depend from the inner surface 33a. As best shown in FIGS. 2, 3 and 5, the outer surface 31a has a substantially flat section 35a which extends from its outside peripheral edge 29a inwardly toward the inside peripheral edge 27a a predetermined distance. The flat section 35a defines a plane. The flat section 35a, at the outside peripheral edge 29a, transitions to an outer surface of 98a of the outer wall portion 38a. The outer surface 31a of the outside wall 30a further has a raised section 34a which extends from the innermost edge of the flat section 35a to the inside peripheral edge 27a. The raised section 34a rises or flares as the outer surface 31a of the outside wall 30a approaches the inside peripheral edge 27a of the housing 24a. As a result, the raised section 34a does not fall in the same plane as the flat section 35a and instead extends outwardly from this plane. The raised section 34a reaches its apex just short of the inside peripheral edge 27a of the housings 24a. The raised section 34a transitions to an outer surface 41a of the inner annular wall portion 32a of the housings 24a. Likewise, the inner surface 33a has a substantially flat section 37a which extends from its outside peripheral edge inwardly toward its inside peripheral edge the same distance as the flat section 35a on the outer surface 31a. The flat section 37a, at the outside peripheral edge, transitions to an inner surface of the outer wall portion 38a. The inner surface 33a of the outside wall 30a has a groove or depression 50a on the underside of the raised section 34a which takes the same shape as the raised section 34a on the outer surface 31a. The groove or depression 50a transitions to an inner surface of inner wall portion 32a. Therefore, a uniform wall thickness is provided by the outside wall 30a. This avoids the formation of sinks or voids when injection molding the housing 24a.

A series of spaced apart platform gussets 54a span the groove or depression 50a. The inner surfaces 55a of the platform gussets 54a are in the same plane as the inner surface 33a of the flat section 37a of the outside wall 30a.

A frictional surface in the form of a series of gripping ribs 36a is provided on the outer surface of the outside wall 30a. As best shown in FIG. 5, the gripping ribs 36a start at the apex of the raised section 34a and extend along the flat section 35a a predetermined distance. For the preferred embodiment, the gripping ribs 36a are integrally molded with the rest of the housing 24a, however; it is contemplated that a second shot of another material, such as neoprene, could be used to form gripping ribs 36a that are softer to the touch if desired.

The wall portions 32a, 38a, 40a are annularly-shaped. The inner wall portion 32a includes an inner surface 41a, an outer surface, and terminates in a free end. The inner surface 41a of the inner wall portion 32a is smooth around its circumference and defines the central hole 26. The outer wall portion 38a includes an inner surface, an outer surface 98a, and terminates in a free end 96a. The inner and outer surfaces of the outer wall portion 38a are smooth around their circumferences. The pinch ring wall portion 40a includes an inner surface, an outer surface 56a, and terminates in a free end. The free ends of portions 32a, 40a terminate along the same plane. The free end of the outer wall portion 38a terminates in a plane which is closer to the outside wall portion 30a than the plane in which the free ends of portions 32a, 40a terminate.

Figure 9:
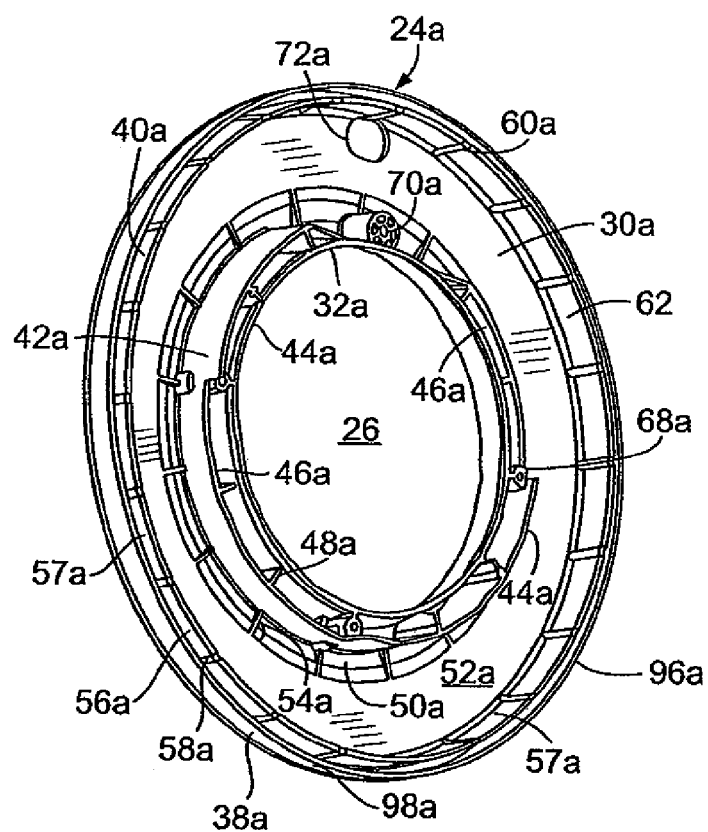
FIG. 9 is a perspective view of one of the housings of the device.

As best shown in FIG. 9, the pinch ring wall portion 40a has a plurality of arcuate sections 57a and a plurality of protuberances 58a which extend from the outer surface thereof. The arcuate sections 57a have a constant diameter when measured from a centerpoint of the device 20. The protuberances 58a are preferably arcuate in shape, and are formed such that the apex of each protuberance 58a has a constant diameter when measured from the centerpoint of the device 20. The apexes of the protuberances 58*a* is farther away from the centerpoint of the device 20 than the apexes of the arcuate sections 57*a*. The protuberances 58*a* alternate with the arcuate sections 57*a* around the circumference of the pinch ring wall portion 40*a*. The inner surface of the pinch ring wall portion 40*a* has depressions 60*a* on the underside of each protuberance 58*a* which takes the same shape as the protuberance 58*a* on the outer surface. Therefore, a uniform wall thickness is provided by the pinch ring wall portion 40*a*. This avoids the formation of sinks or voids when injection molding the housing 24*a*. The protuberances 58*a* can take a variety of shapes, for example, cylindrical or conical bosses could be used instead to ease the manufacturing process.

The locking wall portion 42*a* includes a pair of first sections 44*a* and a pair of second sections 46*a*, which alternate with each other. The free ends of the first sections 44*a* terminate in a plane which is further away from the outside wall 30*a* than the free ends of the second sections 46*a*. The free ends of the first sections 44*a* terminate in the same plane that the free ends of portions 32*a*, 40*a* terminate. At some points, the locking wall portion 42*a* abuts against the inner wall portion 32*a*, and at other points, the locking wall portion 42*a* is spaced apart from the inner wall portion 32*a*. At the points where the locking wall portion 42*a* is spaced apart from the inner wall portion 32*a*, a series of spaced apart, radially extending connecting ribs 48*a* connect the inner wall portion 32*a* and the locking wall portion 42*a* together to provide strength to both portions 32*a*, 42*a*. The locking wall portion 42*a* does not extend in a complete circle around the device 20.

A plurality, shown as four in the drawings, of diametrically spaced apart screw counterbore/boss combinations 68*a* are provided through the outside wall 30*a* and extend outwardly from the inner wall portion 32*a*. At the point where no locking wall portion 42*a* is provided, an anchor point 70*a*, which is formed of circular wall, is provided around one of the counterbore/boss combinations 68*a* and extends from the inner surface of the outside wall 30*a*. The free end of the anchor point 70*a* terminates along a plane which is spaced closer to the outside wall 30*a* than the plane in which the free ends of wall portions 32*a*, 40*a* and first sections 44*a* terminate. The anchor point 70*a* is used to secure the free end of the fish tape 22 to the inside of the device 20 as described herein. A sight hole 72*a* is also provided through the outside wall 30*a*. The sight hole 72*a* is provided a predetermined distance inwardly from the pinch ring wall portion 40*a* in radial alignment with the anchor point 70*a*.

The other housing 24*b* is identical to the housing 24*a*, with the exception of the locking ring wall portion 42*b*. Therefore, the specifics of housing 24*b* are not repeated herein, but identical elements of housing 24*b* to that of housing 24*a* are shown with the same reference numeral having the suffix "b" thereafter.

Locking wall portion 42*b* is generally annularly-shaped, depends generally perpendicular from the inner surface of the outside wall 30*b*, and is spaced a small distance outwardly from the inner wall portion 32*b*. The locking wall portion 42*b* includes a pair of first sections 44*b* and a pair of second sections 46*b*, which alternate with each other. The free ends of the first sections 44*b* terminate in a plane which is closer to the outside wall 30*b* than the plane in which the free ends of the second sections 46*b* terminate. The free ends of the second sections 44*b* terminate in the same plane that the free ends of wall portions 32*b*, 40*b* terminate. At some points, the locking wall portion 42*b* abuts against the inner wall portion 32*b*, and at other points, the locking wall portion 42*b* is spaced apart from the inner wall portion 32*b*. At the points where the locking walls portion 42*b* is spaced apart from the inner wall portion 32*b*, a series of spaced apart, radially extending connecting ribs 48*b* connect the inner wall portion 32*b* and the locking wall portion 42*b* together to provide strength to both wall portions 32*b*, 42*b*. The locking wall portion 42*b* does not extend in a complete circle around the device 20. At the point where no locking wall portion 42*b* is provided, an anchor point 70*b*, which is formed of circular wall, is provided around one of the counterbore/boss combinations 68*b* and extends from the inner surface of the outside wall 30*b*. The free end of the anchor point 70*b* terminates along a plane which is spaced closer to the outside wall 30*b* than the plane in which the free ends of wall portions 32*b*, 40*b* and second sections 46*b* terminate.

When the housings 24*a*, 24*b* are mated, the free ends of the inner wall portions 32*a*, 32*b* abut each other to form a wall, the outer wall portions 38*a*, 38*b* form a wall and the free ends of the outer wall portions 38*a*, 38*b* are proximate to each other but spaced apart from each other such that a gap 71 is formed therebetween, and the free ends of the pinch ring wall portions 40*a*, 40*b* abut each other, except as described herein. The pinch ring wall portions 40*a*, 40*b* form a wall. In addition, the free ends of the first sections 44*a* of locking wall portion 42*a* abut against the free ends of the first sections 44*b* of the locking wall portion 42*b* to form a wall, and the free ends of the second sections 44*a* of locking wall portion 42*a* abut against the free ends of the second sections 44*b* of the locking wall portion 42*b* to form a wall. The screw counterbore/boss combinations 68*a* align with screw counterbore/boss combinations 68*b*. The protuberances 58 of each housing 24*a*, 24*b* also align.

The housings 24*a*, 2*bb* are screwed together using the four screws 100 that are seated within the screw counterbore/boss combinations 68*a*, 68*b*. One of the screws extends through the anchor points 70 of the housings 24*a*, 24*b*.

As a result, a winding belt chamber 102, in which the winding belt 66, 66' is stored, is defined between the wall defined by the outer wall portions 38*a*, 38*b*, the wall defined by the pinch ring wall portions 40*a*, 40*b* and the outside walls 30*a*, 30*b*. A fish tape storage chamber 106, in which the fish tape 22 is stored, is defined by the outside walls 30*a*, 30*b*, the wall defined by the pinch ring wall portions 40*a*, 40*b*, and the wall defined by the locking wall portions 42*a*, 42*b*.

The web 78 of the winding belt 66, 66' is seated within the gap 71 between the free ends 96*a*, 96*b* of the outer wall portions 38*a*, 38*b*, and the shoe portion 76 is proximate to the outer surfaces 98*a*, 98*b* of the outer wall portions 38*a*, 38*b*. The hoop 64, 64' sits within the winding belt chamber 102. The hoop 64, 64' can freely slide in the winding belt chamber 102 when wound by a user. The hoop 64, 64' has a width which is greater than the width of the gap 71 between the outer wall portions 38*a*, 38*b*, thereby effectively closing the housings 24*a*, 24*b*.

The eye 28 of the fish tape 22 is sandwiched between the anchor points 70; and the remainder of fish tape 22 is wound in the fish tape storage chamber 106. An end portion of the fish tape 22 exits the storage chamber 106, thereby creating a slight gap between the pinch ring wall portions 40*a*, 40*b* at the point where the fish tape 22 passes therebetween. The remainder the pinch ring wall portions 40*a*, 40*b* abut each other. The end portion of the fish tape 22 extends through the slot 84. The hoop 64, 64' obstructs the gap 71 such that the fish tape 22 that is held in the storage chamber 106 cannot fall out of the device 20 unintentionally.

Figure 6:
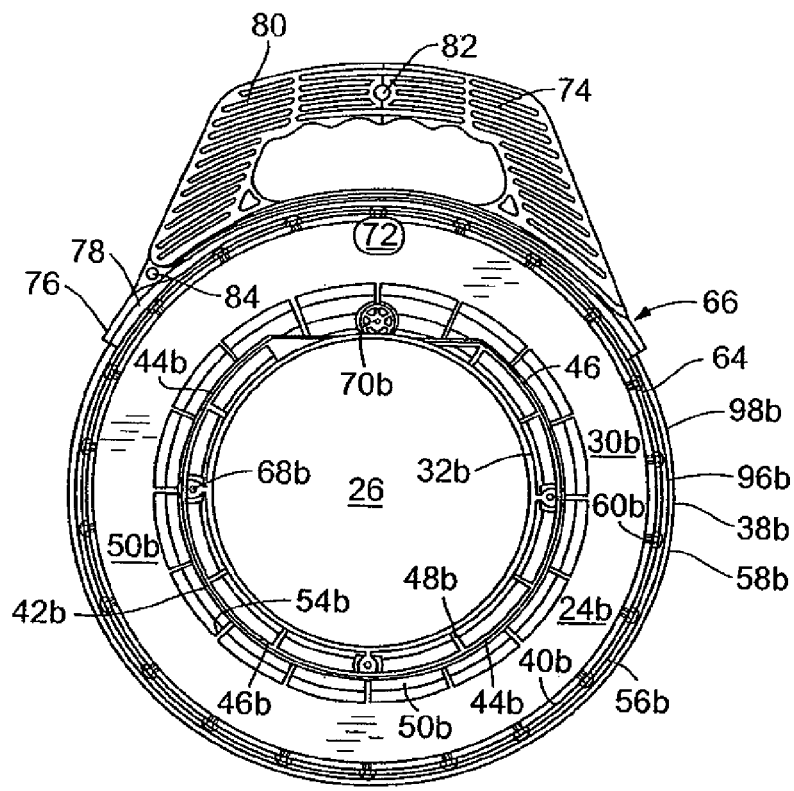
FIG. 6 is an elevational view of the device with one housing and the fish tape removed therefrom.
Figure 10:
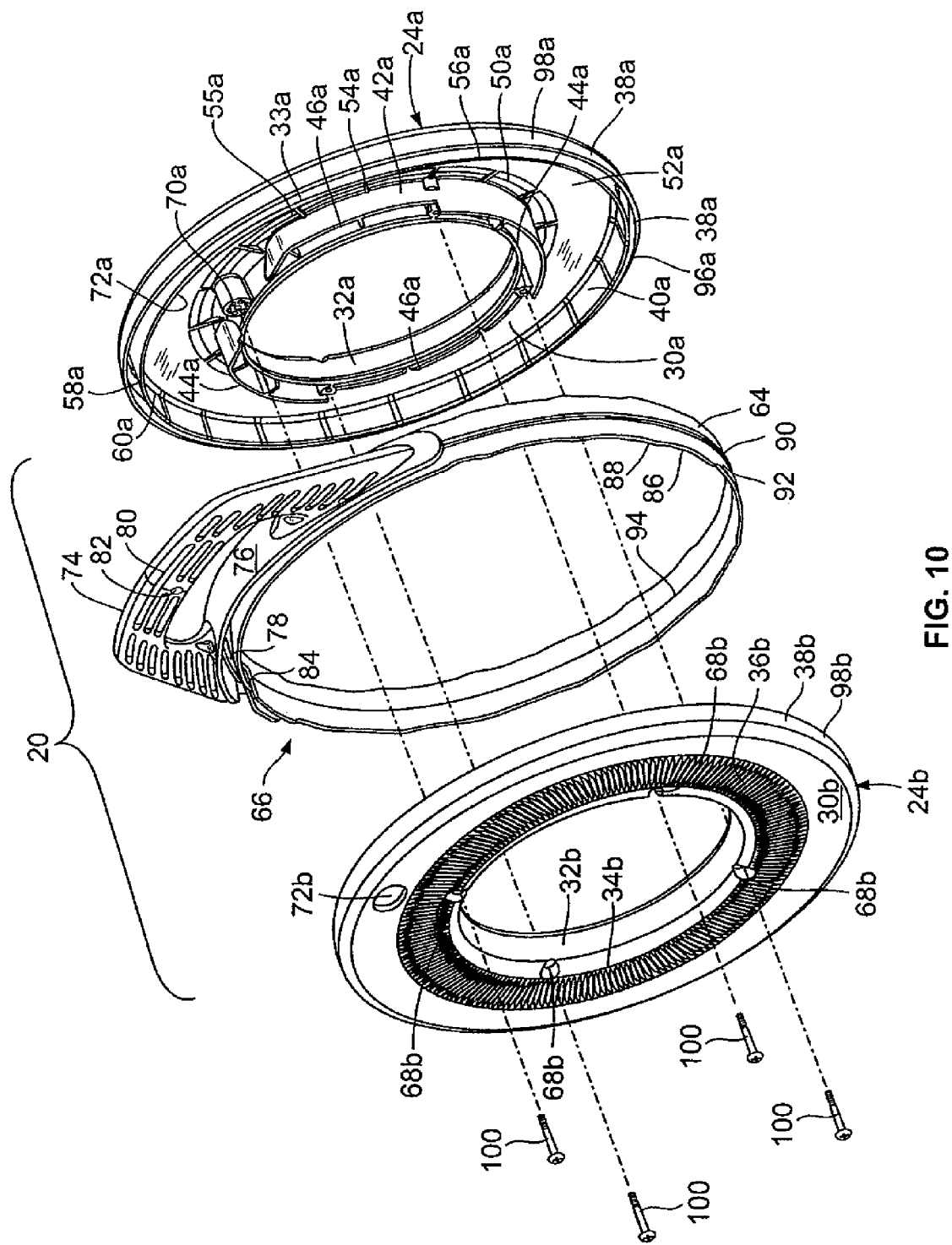
FIG. 10 is an exploded assembly view of the device with the fish tape removed.

As best seen in FIGS. 6 and 10, the device 20 is assembled in the following manner. First, the winding belt 66, 66' is placed into one housing, for example housing 24*a*, such that the hoop 64, 64' is seated within the winding belt chamber 102, the web 78 of the winding belt 66, 66' abuts against the free end 96a of the outside wall portion 38a, and the shoe 76 is positioned next to the outer surface 98a of the outside wall portion 38a. The winding belt 66, 66' is configured such that the web 78 bottoms out on the free end 96a of the outside wall portion 38a so that side walls with the undulating sections 88, 88' of the hoop 64, 64' will contact the inside surface 33a of the outside wall 30a less frequently, minimizing friction (see FIGS. 4 and 5). The assembler then attaches the eye 28 of one end of the fish tape 22 (fish tape is not shown in FIGS. 6 and 10) over a screw 100 that has already been inserted through the anchor point 70a and winds the fish tape 22 in a counter-clockwise direction in the area found between the pinch ring wall portion 40a and the locking wall portion 42a and places the fish tape 22 into the slot 84 of the handle 74 of the winding belt 66, 66' and on top of a small portion of the pinch ring wall portion 40a. Next, the other housing 24b is aligned with its sight hole 72b being over the sight hole 72a of the first housing 24a. This indicates that the high and low sections 44a, 44b, 46a, 46b of the locking wall portions 42a, 42b will mate and interlock properly, preventing the housing 24a, 24b from being able to rotate relative to each other. The pinch ring wall portions 40a, 40b abut each other except for the slight gap found between the pinch ring wall portions 40a, 40b near the location where the fish tape 22 exits the storage chamber 106 as previously described, closing off the interior of the device 20 to the outside, while at the same time the protuberances 58a, 58b of each housing 24a, 24b also align. The housings 24a, 24b are screwed together using the four screws 100 that are seated within the screw counterbore/boss combinations 68a, 68b. The screw 100 that extends through the anchor points 70a, 70b of the housings 24a, 24b and attaches the eye 28 of the fish tape 22 to the device 20 is sufficient to hold the fish tape 22 fixed and allow the device 20 to be inserted into a winding machine that holds the housings 24a, 24b stationary and spins the handle 74 in a clockwise direction as shown by FIG. 6 which causes the fish tape 22 to be wound within the storage chamber 106 as is commonly done in the art. Once the fish tape 22 is fully wound, the user will be able to see how much fish tape 22 is inside the storage chamber 106 by looking through the sight holes 72a, 72b of the housings 24a, 24b to see the amount of fish tape 22 stored therein. The user can periodically check the amount left when dispensing the fish tape 22 by quickly glancing at the sight holes 72a, 72b (for example, see FIG. 1).

The raised sections 34a, 34b of the housings 24a, 24b fits ergonomically in the hand of a user, making it easier for the user to grip the device 20 firmly, thereby preventing any slippage when the device 20 is used to dispense or retract fish tape 22. Since the raised section 34 is found on both sides of the device 20 and is arranged in an annular manner about the central hole 26, this ergonomic advantage is present regardless of whether a right hand or a left hand is inserted into the central hole 26 or what angular orientation around the inner perimeter of the device 20 a hand is placed. The rise and fall of raised sections 34a, 34b are smoothly blended to the flat sections 35a, 35b of the outside walls 30a, 30b and the inner wall portions 32a, 32b so that as a user inserts their hand through the central hole 26 of the device 20 and grabs both sides of the raised sections 34a, 34b, the fingers, palm and thumb of the user's hand encounter no uncomfortable edges. Furthermore, the gripping ribs 36a, 36b provided just outside the raised sections 34a, 34b allow the fingers, thumb, and palm of the user to rest thereupon, such that the fingers, thumb, and palm of the user and are less likely to slip when gripping the device 20.

The raised sections 34a, 34b of the housings 24a, 24b, with their complimentary shaped grooves or depressions 50a, 50b would create a potential snag or catch point for the fish tape 22 within the raised sections 34a, 34b which could create more friction when dispensing or retracting the fish tape 22. The provision of the plurality of platform gussets 54a, 54b that span the grooves or depressions 50a, 50b support the fish tape 22, preventing this problem from occurring.

The protuberances 58a, 58b provided on the pinch ring wall portions 40a, 40b contact the hoop 64, 64' of the winding belt 66, 66' during the winding and unwinding process of the fish tape 22.

In operation, as the user rotates the handle 74 to dispense or retract the fish tape 22, the undulations 88, 88' of the hoop 64, 64' of the winding belt 66, 66' may occasionally contact the inside surfaces 33a, 33b of the outside wall 30a, 30b of the housings 24a, 24b. Since the scallop sections 88, 88' are intermittent, the amount of surface contact between the housings 24a, 24b and the side walls of the hoop 64, 64' is minimized as is the generation of friction. Of course, it is preferred that the undulations 88, 88' be rounded so that only tangential or line contact is made between the hoop 64, 64' and the housings 24a, 24b, minimizing friction even more. Likewise, the inside circumferential surface 94, 94' of the hoop 64, 64' will occasionally contact the outer surface 56a, 56b of the pinch ring wall portions 40a, 40b. The protuberances 58a, 58b provided along these outer surface 56a, 56b minimize the surface area of contact and the amount of friction produced. Similarly, it is preferable that the protuberances 58a, 58b have rounded or arcuate configurations so that only tangential or line contact is made which also enhances the friction reduction.

As can be seen, this fish tape device 20 solves the aforementioned need of reducing friction when dispensing or retracting fish tape 22 by providing a scalloped winding belt 66, 66' and protuberances 58a, 58b in the housings 24a, 24b. Also, the need of providing a more ergonomic device 20 that does not slip in hand of the user when winding or unwinding the fish tape 20 has also been solved by creating housings 24a, 24b that has raised sections 34a, 34b near its center hole 26 that fits easily in the hand of the user. Although the preferred embodiment shows the needs being achieved in a particular manner, it is contemplated that those with ordinary skill in the art may make subtle changes such as relocating the protuberances 58a, 58b and scalloped sections 88, 88' to other areas of the device 20 or by changing the size or shape of the housings 24a, 24b to achieve the same ergonomic advantage described above. Accordingly, the scope and spirit of this invention should not be limited to the preferred embodiment disclosed herein but should be interpreted in view of the attached claims.

While preferred embodiments of the present invention are shown and described, it is envisioned that those skilled in the art may devise various modifications of the present invention without departing from the spirit and scope of the appended claims.

The invention claimed is:

1. A device for dispensing fish tape comprising:
a pair of spaced apart outside walls, each said outside wall having an outside peripheral edge and an inside peripheral edge and a predetermined length from said outside peripheral edge to said inside peripheral edge, each said outside wall having an inner surface and an outer surface opposite to said inner surface such that a width of each said outside wall is defined, said inner surfaces facing each other, each said outer surface having a flat section extending from said outside peripheral edge toward said inside peripheral edge, and a raised section extending from said flat section to said inside peripheral edge, said flat section defining a plane and said raised section extending outwardly from said plane;

an outer wall depending generally perpendicularly from said outside walls at said outside peripheral edges thereof, said outer wall being annular such that a circumference is defined;

an inner wall depending generally perpendicularly from said outside walls at said inside peripheral edges thereof, said inner wall defining a central hole having a circumference through said device, said outside, outer and inner walls forming a chamber therein;

said raised section extending completely around the circumference of said central hole of the device; and a fish tape mounted within said chamber.

2. The device defined in claim 1, wherein each said inner wall is annular.

3. A device for dispensing fish tape comprising:

a pair of spaced apart outside walls, each said outside wall having an outside peripheral edge and an inside peripheral edge and a predetermined length from said outside peripheral edge to said inside peripheral edge, each said outside wall having an inner surface and an outer surface opposite to said inner surface such that a width of each said outside wall is defined, said inner surfaces facing each other, each said outer surface having a flat section extending from said outside peripheral edge toward said inside peripheral edge, and a raised section extending from said flat section to said inside peripheral edge; each said outside wall has a consistent width along the length thereof, such that a first flat section is provided on said inner surface opposite to said flat section on said outer surface, and a second grooved section is provided on said inner surfaces opposite to said raised section, said second grooved section being complementary in shape to said raised section;

an outer wall depending generally perpendicularly from said outside walls at said outside peripheral edges thereof, said outer wall being annular such that a circumference is defined;

an inner wall depending generally perpendicularly from said outside walls at said inside peripheral edges thereof, said inner wall defining a central hole having a circumference through said device, said outside, outer and inner walls forming a chamber therein;

said raised section extending completely around the circumference of said central hole of the device; and a fish tape mounted within said chamber.

4. The device defined in claim 3, further including a plurality of spaced apart support gussets spanning said grooves, said fish tape being capable of engaging with said support gussets.

5. The device defined in claim 4, wherein an inner surface of each said support gusset is in the same plane as the inner surface of the respective first flat section provided on the inner surface.

6. The device defined in claim 3, wherein each said raised section flares proximate to said inside peripheral edge such that an apex of each said raised section is close to said respective inside peripheral edge.

7. The device defined in claim 1, wherein each said raised section flares proximate to said inside peripheral edge such that an apex of each said raised section is close to said respective inside peripheral edge.

8. The device as defined in claim 1, further including:

a gap provided through said outer wall around the circumference thereof;

a winding belt including a hoop provided within said chamber, a handle positioned outside of the outer wall proximate to said gap, and a web connecting said handle and said hoop together, said web being positioned within said gap;

said fish tape engaging with said winding belt.

9. The device defined in claim 8, further including an intermediate wall attached to said outside walls between said inner and outer walls and partially segregating said fish tape from said winding belt.

10. The device defined in claim 9, wherein said hoop of said winding belt has at least one undulation thereon, said at least one undulation capable of contacting said intermediate wall.

11. The device defined in claim 10, wherein said intermediate wall has a plurality of spaced apart protuberances thereon, said at least one undulation capable of contacting said plurality of spaced apart protuberances.

12. The device defined in claim 10, wherein said fish tape is flat.

13. The device defined in claim 1, wherein one of said outside walls, a portion of said outer wall and a portion of said inner wall are formed from a first housing; and the other of said outside walls, another portion of said outer wall and another portion of said inner wall are formed from a second housing, said first housing and said second housing being mated together.

14. A device for dispensing fish tape comprising:

first and second spaced apart outside walls, each said outside wall having an outside peripheral edge and an inside peripheral edge, an inner surface and an outer surface opposite to said inner surface, said inner surfaces facing each other;

an outer wall depending generally perpendicularly from said outside walls at said outside peripheral edges thereof, said outer wall being annular such that a circumference is defined, a gap provided through said outer wall around the circumference thereof;

an inner wall depending generally perpendicularly from said outside walls at said inside peripheral edges thereof, said inner wall defining a central hole through said device;

a first intermediate wall portion depending generally perpendicularly from said first outside wall and positioned between said inner and outer walls, said first intermediate wall portion being annular such that a circumference is defined, said first intermediate wall portion having a predetermined height from an edge which is connected to said first outside wall to a free end thereof, an inner surface facing said inner wall, and an outer surface opposite to said inner surface and facing said outer wall, a width of said first intermediate wall portion defined between said inner and outer surfaces thereof;

a plurality of spaced apart protuberances provided on said outer surface of said first intermediate wall portion;

a second intermediate wall portion depending generally perpendicularly from said second outside wall and positioned between said inner and outer walls, said second intermediate wall portion having a predetermined height from an edge which is connected to said second outside wall to a free end thereof, said second intermediate wall portion being annular such that a circumference is defined, an inner surface facing said inner wall, and an outer surface opposite to said inner surface and facing said outer wall, a width of said second intermediate wall portion defined between said inner and outer surfaces thereof;

a plurality of spaced apart protuberances provided on said outer surface of said second intermediate wall portion;

a first portion of said outside walls, said outer wall and said first and second intermediate wall portions defining an outer chamber therebetween;

a second portion of said outside walls, said inner wall and said first and second intermediate wall portions defining an inner chamber therebetween;

a winding belt including a hoop provided within said outer chamber, said hoop having a plurality of undulations thereon, said plurality of undulations capable of contacting said plurality of spaced apart protuberances, a handle positioned outside of the outer wall proximate to said gap, and a web connecting said handle and said hoop together, said web being positioned within said gap; and a fish tape provided within said inner chamber, said fish tape passing between said first and second intermediate wall portions and engaging with said winding belt.

15. The device defined in claim 14, wherein each said intermediate wall portion has a consistent thickness around the circumference thereof.

16. The device defined in claim 14, wherein said protuberances on said first intermediate wall portion are aligned with said protuberances on said second intermediate wall portion.

17. The device defined in claim 14, wherein said protuberances on said first and second intermediate wall portions are curved.

18. The device defined in claim 14, wherein said first outside wall, a first portion of said outer wall, a first portion of said inner wall and said first intermediate wall portion are formed from a first housing; and said second outside wall, a second portion of said outer wall, a second portion of said inner wall and said second intermediate wall portion are formed from a second housing, said first housing and said second housing being mated together.

19. The device defined in claim 14, wherein each said outside wall has a predetermined length from said outside peripheral edge to said inside peripheral edge, said inner surface and said outer surface of each said outside wall defining a width of said respective outside wall, each said outer surface having a flat section extending from said outside peripheral edge toward said inside peripheral edge, and a raised section extending from said flat section to said inside peripheral edge.

20. The device defined in claim 19, wherein each said outside wall has a consistent width along the length thereof, such that a first flat section is provided on said inner surface opposite to said flat section on said outer surface, and a second grooved section is provided on said inner surfaces opposite to said raised section, said second grooved section being complementary in shape to said raised section.

21. The device defined in claim 20, further including a plurality of spaced apart support gussets spanning said grooves, said fish tape being capable of engaging with said support gussets.

22. The device defined in claim 21, wherein an inner surface of each said support gusset is in the same plane as the inner surface of the respective first flat section provided on the inner surface.

23. The device defined in claim 20, wherein each said raised section flares proximate to said inside peripheral edge such that an apex of each said raised section is close to said respective inside peripheral edge.

24. The device defined in claim 19, wherein each said raised section flares proximate to said inside peripheral edge such that an apex of each said raised section is close to said respective inside peripheral edge.

25. A device for dispensing fish tape comprising:

first and second spaced apart outside walls, each said outside wall having an outside peripheral edge and an inside peripheral edge, an inner surface and an outer surface opposite to said inner surface, said inner surfaces facing each other;

an outer wall depending generally perpendicularly from said outside walls at said outer outside peripheral edges thereof, said outer wall being annular such that a circumference is defined, a gap provided through said outer wall around the circumference thereof;

an inner wall depending generally perpendicularly from said outside walls at said inner inside peripheral edges thereof, said inner wall defining a central hole through said device;

an intermediate wall depending generally perpendicularly between said first and second outside walls and positioned between said inner and outer walls, said intermediate wall having an inner surface facing said inner wall and an outer surface opposite to said inner surface and facing said outer wall, said intermediate wall having a gap provided therethrough;

a plurality of spaced apart protuberances provided on said outer surface of said intermediate wall;

a first portion of said outside walls, said outer wall and said intermediate wall defining an outer chamber therebetween;

a second portion of said outside walls, said inner wall and said intermediate wall defining an inner chamber therebetween;

a winding belt including a hoop provided within said outer chamber, said hoop having a plurality of undulations thereon, said plurality of undulations capable of contacting said plurality of spaced apart protuberances, a handle positioned outside of the outer wall proximate to said gap, and a web connecting said handle and said hoop together, said web being positioned within said gap; and a fish tape provided within said inner chamber, said fish tape passing through said intermediate wall and engaging with said winding belt.

* * * * *